(12) United States Patent
Nadeau et al.

(10) Patent No.: US 8,190,945 B2
(45) Date of Patent: *May 29, 2012

(54) METHOD FOR MAINTAINING TRACK DATA INTEGRITY IN MAGNETIC DISK STORAGE DEVICES

(75) Inventors: Brian G. Nadeau, Nashua, NH (US);
Bryan K. Panner, Windham, NH (US);
Mark N. Bokhan, Milford, NH (US);
Peter J. Hunter, Amherst, NH (US);
Damon J. Hung, Chelmsford, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/284,021

(22) Filed: Sep. 17, 2008

(65) Prior Publication Data

US 2009/0083584 A1 Mar. 26, 2009

Related U.S. Application Data

(63) Continuation of application No. 10/841,258, filed on May 7, 2004, now Pat. No. 7,475,276.

(51) Int. Cl.
*G06F 11/00* (2006.01)
(52) U.S. Cl. ..................................................... 714/6.11
(58) Field of Classification Search .................. 714/6.13, 714/6.2, 6.21, 6.22, 6.32
See application file for complete search history.

(56) References Cited

U.S. PATENT DOCUMENTS

| | | | |
|---|---|---|---|
| 4,516,165 A | 5/1985 | Cunningham et al. | |
| 5,166,936 A | 11/1992 | Ewert et al. | |
| 5,379,162 A | 1/1995 | Cunningham et al. | |
| 5,974,544 A | 10/1999 | Jeffries et al. | |
| 6,204,660 B1 | 3/2001 | Lee | |
| 6,324,660 B1 | 11/2001 | Majima et al. | |
| 6,384,599 B1 | 5/2002 | Chan et al. | |
| 6,397,347 B1 | 5/2002 | Masuyama et al. | |
| 6,405,277 B1 | 6/2002 | Jen et al. | |
| 6,442,705 B1 | 8/2002 | Lamberts | |
| 6,628,471 B1 | 9/2003 | Min et al. | |

(Continued)

FOREIGN PATENT DOCUMENTS

EP 0114255 A1 7/1984

(Continued)

OTHER PUBLICATIONS

Anonymous, "Prevention of Hard Errors in Magnetic Files Due to Long Term Degradation," *IBM Technical Disclosure Bulletin* 29(10):4577-4578 (1987).

(Continued)

*Primary Examiner* — Michael Maskulinski
(74) *Attorney, Agent, or Firm* — Hamilton, Brook, Smith & Reynolds, P.C.

(57) ABSTRACT

Techniques for detection of impending data errors in a mass storage system, such as a track squeeze problem in an electromagnetic disk drive, and then repairing the impending problem, such as by rewriting the affected tracks. In many cases the problem is detected and repair is effected when the original data can still be read. In other cases, when the data is no longer readable on the disk in question, but when the disk is part of a Redundant Array of Independent Disks (RAID) system, or other system in which higher layer fault tolerance mechanisms are implemented, the missing data can be recovered via these mechanisms. The recovered data is then used to repair the track squeeze problem. The invention can be implemented as firmware in a storage system, as a component of a general purpose operating system, or inside individual disk drives, or it can use a combination of these implementations.

64 Claims, 10 Drawing Sheets

U.S. PATENT DOCUMENTS

| | | |
|---|---|---|
| 6,882,489 B1 | 4/2005 | Brunnett et al. |
| 7,023,648 B2 | 4/2006 | Mizukoshi |
| 7,650,686 B2 | 1/2010 | Quilapquilap |
| 2002/0067567 A1 | 6/2002 | Szita |
| 2003/0026019 A1 | 2/2003 | Smith |
| 2004/0193798 A1 | 9/2004 | Kuwamura |
| 2005/0007690 A1 | 1/2005 | Wong et al. |

FOREIGN PATENT DOCUMENTS

| | | |
|---|---|---|
| JP | 59 121606 | 7/1984 |
| JP | 05-257617 | 10/1993 |
| JP | H05-257617 | 10/1993 |
| JP | 10-340401 | 12/1998 |
| JP | 11-338648 | 12/1999 |
| JP | 2000-311452 | 11/2000 |
| JP | 2000-322334 | 11/2000 |
| JP | 2000-322334 A | 11/2000 |
| JP | 2004-063013 | 2/2004 |
| JP | 2004-110946 | 4/2004 |
| JP | 2004-273060 | 9/2004 |

OTHER PUBLICATIONS

S.M.A.R.T. Attributes, http:smartlinux.sourceforge.net/smart/attricutes.phb, downloaded Mar. 13, 2007, 2 pages.

Get S.M.A.R.T. for Reliability, Seagate Technology Paper No. TP-67D, Jul. 1999 (exact date not available).

IBM Corp., "Prevention of Hard Errors in Magnetic Files Due to Long Term Degradation," *IBM Technical Disclosure Bulletin* 29(10):4577-4578 (1987).

First Notification of Reasons for Rejection (Non-final) in Japanese Patent Application No. 2005-134986, Dated: Jul. 22, 2008. (English translation).

Second Notification of Reasons for Rejection (Non final) in Japanese Patent Application No. 2005 134986, Dated: Feb. 10, 2009 (English Translation).

Third Notification of Reasons for Rejection (Non final) in Japanese Patent Application No. 2005 134986, Dated: Sep. 15, 2009 (English Translation).

Fourth Notification of Reasons for Rejection (Final) in Japanese Patent Application No. 2005 134986, Dated: Jan. 19, 2010 (English Translation).

Final Rejection in Japanese Patent Application No. 2000-134986, Dated: May 27, 2010 (English Translation.

Decision of Examining Division of EP Application No. 05 252 837.9 dated May 5, 2011, 13 pages.

Minutes of Oral Proceeding of EP Application No. 05 252 837.9 held on Apr. 19, 2011, 8 pages.

METHOD FOR MAINTAINING TRACK DATA INTEGRITY IN MAGNETIC DISK STORAGE DEVICES

RELATED APPLICATION(S)

This application is a continuation of U.S. application Ser. No. 10/841,258, filed May 7, 2004 now U.S. Pat. No. 7,475,276. The entire teachings of the above application(s) are incorporated herein by reference.

BACKGROUND OF THE INVENTION

Current generation magnetic disk storage devices are vulnerable to data integrity problems that appear gradually. At first, recovery from such problems may require only the use of the conventional drive Error Correcting Code (ECC) processing or Input/Output (I/O) retry operations. However, these problems gradually worsen to the point that data may become unrecoverable. An example of a data integrity problem of this kind is known as "track squeeze".

Track squeeze is seen especially in very high data density devices, when they are used under high loads in server applications. It appears when a track on the disk drive is written only rarely, while one or both of the adjacent tracks are written much more frequently. Due to the finite positioning tolerance of the head actuator mechanism, the electromagnetic forces used to effect adjacent track writes intrude to some extent into the rarely written track, causing reduced signal strength of the affected track. This in turn causes data errors during read operations. This problem can be reduced or avoided by reducing the track density on the disk surface or increasing the sophistication and accuracy of the head actuator and the data read process, but all of these techniques have associated cost.

When errors such a track squeeze initially begin to appear, the impact is modest enough that conventional disk drive error recovery mechanisms (such as read retry or drive ECC) can recover the data. In that case, the problem is not visible to higher layer I/O processing or application programs as an error, but it nevertheless causes performance loss due to the time required to perform these corrective mechanisms.

As gradual onset errors such as track squeeze become more severe, they progress beyond the point where disk drive error recovery mechanisms can handle them. In that case, I/O operations begin to fail at the disk drive level. Mechanisms for fault tolerant data storage such as Redundant Arrays of Independent Disks ( ) are effective for maintaining data availability even in the presence of unrecoverable errors in the underlying disk drives. However, this is only the case when the error rate is low enough that the probability of errors beyond the recovery capability of RAID is extremely low. Therefore, normal practice with RAID is to consider as "failed" any disk drive that produces more than a very low error rate.

In the presence of problems such as track squeeze, such a practice may cause disk drives to be considered as "failed" at a rate well in excess of what is acceptable to customers or economically tolerable to storage system suppliers.

SUMMARY OF THE INVENTION

Thus there is a need for a mechanism that can detect gradual onset errors such as track squeeze, and then take corrective action to eliminate the error. Such a mechanism would allow disk drives to continue in normal service as good drives.

The present invention is directed to techniques that detect impending data errors such as the track squeeze problem, and, furthermore, to repair the problem or impending problem when detected, such as by rewriting the affected tracks. In many cases the problem is detected and repair is effected when the original data can still be read. As a result, that original data is used directly to do the repair.

In other cases, the data is no longer readable on the disk in question, but when the disk is part of a RAID system, or other system in which higher level, system fault tolerance mechanisms are implemented, the missing data can be recovered via RAID layer mechanisms and then used to repair the track squeeze problem.

The invention can be implemented as firmware in a storage system, as a component of a general purpose operating system, or inside individual disk drives, or it can use a combination of these implementations.

The invention can also be implemented as part of a functioning system in use by a customer in the field, in a manufacturing screening process, or in a diagnosis and repair of units returned from the field.

The present invention offers a number of advantages over the prior art.

It is frequently desirable to reduce the cost of disk drives in a storage system. This need is particularly acute in massive storage arrays consisting of many individual storage units. "Commodity" drives based on technology used in high volume desktop PC systems are usually the most attractive option, since they provide the lowest cost per megabyte of storage. However, most manufacturers of storage arrays typically consider the commodity drives having the highest available storage density per unit to not be the best choice, because they typically do not provide the highest reliability. For example, while gradual onset errors such a track squeeze can potentially occur in any modern type of disk drive, they are a particular concern in commodity disk drives because of the higher track density and the cost pressures on the drive mechanical and electronic components. In a personal computer (PC) intended for use by an individual, a typical access to the drive occurs so infrequently that errors do not appreciably affect performance. However, in storage arrays used in file servers and the like, as mentioned above, it is necessary to keep disk drive error rates very low, not only to avoid customer data loss, but also to control product support costs due to drive replacement.

By detecting errors such as track squeeze usually before the point where they are severe enough to cause unrecoverable data loss, the invention protects customer data from these errors. And by corrective action that actually repairs the underlying problem, the invention effectively eliminates errors such as track squeeze from being a factor in limiting the useful life of disk drives or a factor in the failure rate of disk drives in the field. Repairing the underlying problem also repairs the performance loss that appears when the errors are still recoverable by normal disk drive recovery mechanisms such as ECC or read retry. These benefits now makes it economically feasible to now use lower cost higher density disk drives ("commodity" drives), which provide desktop PC technology and manufacturing efficiencies, in high-availability applications such as server and network attached storage systems.

Also, the invention relies only on properties of conventional industry standard disk drives. It does not require any specialized error indications, counters, or non-standard drive commands. Furthermore, the invention comprises both detection and repair, after which the impending problem is eliminated. It is not merely an enhanced read error retry scheme— which might delay the point at which gradual onset errors become unrecoverable, and which does not correct the underlying problem.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
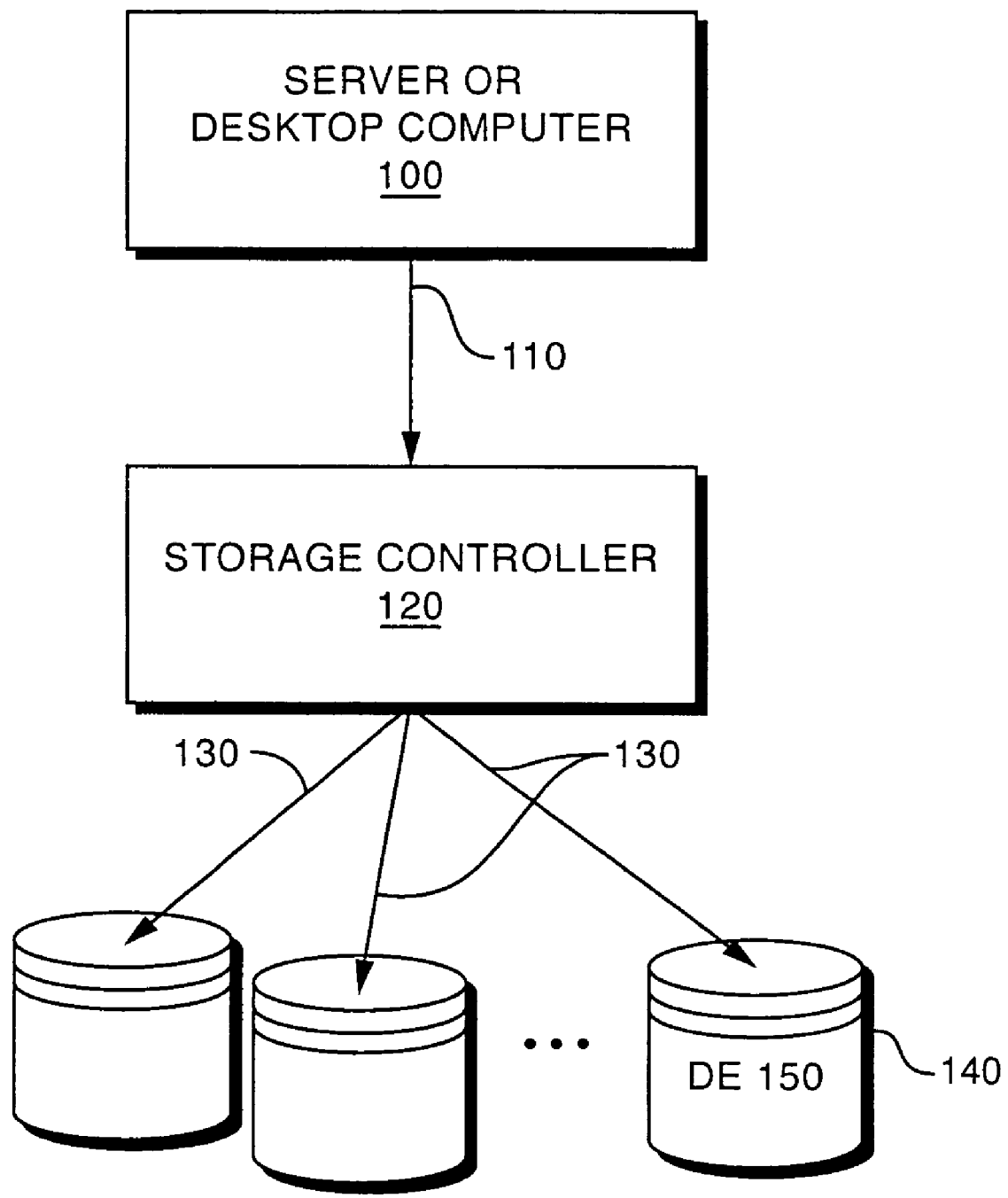
FIG. 1 shows a computer system with associated disk storage.

FIG. 1 shows a computer system, which may be a server system or a user workstation such as a desktop or laptop computer. The host or base computer 100 (the central processor of the computer system excluding its attached storage), connects to a storage controller 120. The storage controller 120 may be a simple disk controller, or it may incorporate more advanced storage mechanisms such as Redundant Array of Independent Disks (RAID). The computer 100 is connected to the controller 120 via an interconnect 110. The interconnect may be a system bus such as the Peripheral Component Interface (PCI) bus, or it may be a Storage Area Network (SAN) based on Fibre Channel or other SAN technology. The storage controller 120 in turns connects to one or more disk drives 140, via disk channels 130. The disk channels may be provided any suitable disk drive interface such as Advanced Technology Attachment (ATA), Small Computer System Interface (SCSI) or other disk interfaces.

The processes described below may be implemented in computer 100, in storage controller 120, or within drive electronics 150 contained in the disk drives 140. When implemented in computer 100, typically the implementation would be part of the operating system or device drivers installed in that computer. When implemented in computer 100 or storage controller 120, the recovery process described in FIG. 7 may be used, if the computer or storage controller includes higher system layer functions, such as a RAID fault tolerance mechanism, data mirroring, or backup. When implement in the drive electronics 150 of disk drives 140, typically the recovery process described in FIG. 6 would be applied, unless provision is made to communicate with any higher layer fault tolerance mechanisms implemented elsewhere, e.g., in storage controller 120.

Figure 7:
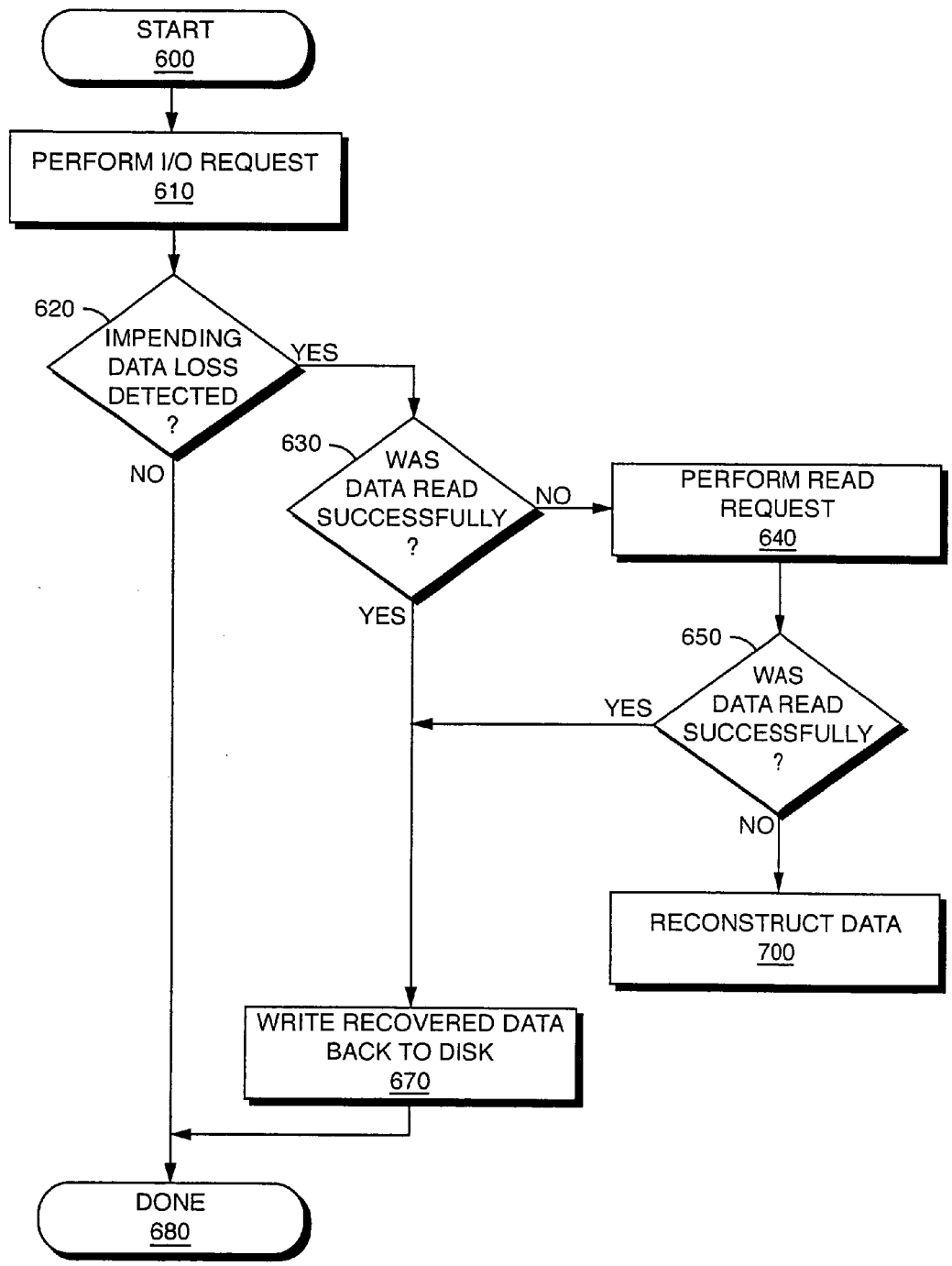
FIG. 7 shows the error repair process in a system where higher layer redundancy mechanisms such as RAID are implemented.

In addition, the processes described below might be implemented in part in one component and in part in another. For example, the detection processes described in FIGS. 2 through 5 might be implemented in disk drives 140, while the recovery mechanism described in FIG. 7 is implemented in storage controller 120.

FIGS. 2 through 5 shows flow charts for four different variations for processes that detect impending data integrity errors (impending data loss).

In each of these flow charts, the process shown performs the actual I/O operations requested by other components of the system, along with detection steps that serve to detect impending data errors. The intent of these steps is to be able, in many cases, to indicate that data loss is threatened before such loss actually occurs. As a result, the threatened data is typically still readable, and this data is available for the repair process. Several of the variations shown here rely on a common characteristic of the class of errors to be detected, namely that the early stages of gradual onset errors such as track squeeze are recoverable by the disk drive using its normal error recovery mechanism, but these mechanisms take time and are therefore detectable by observing the drive performance. It should be noted that these approaches are applicable to all disk drives, and are not dependent on any unusual or customized error reporting capabilities in the disk drives.

Figure 2:
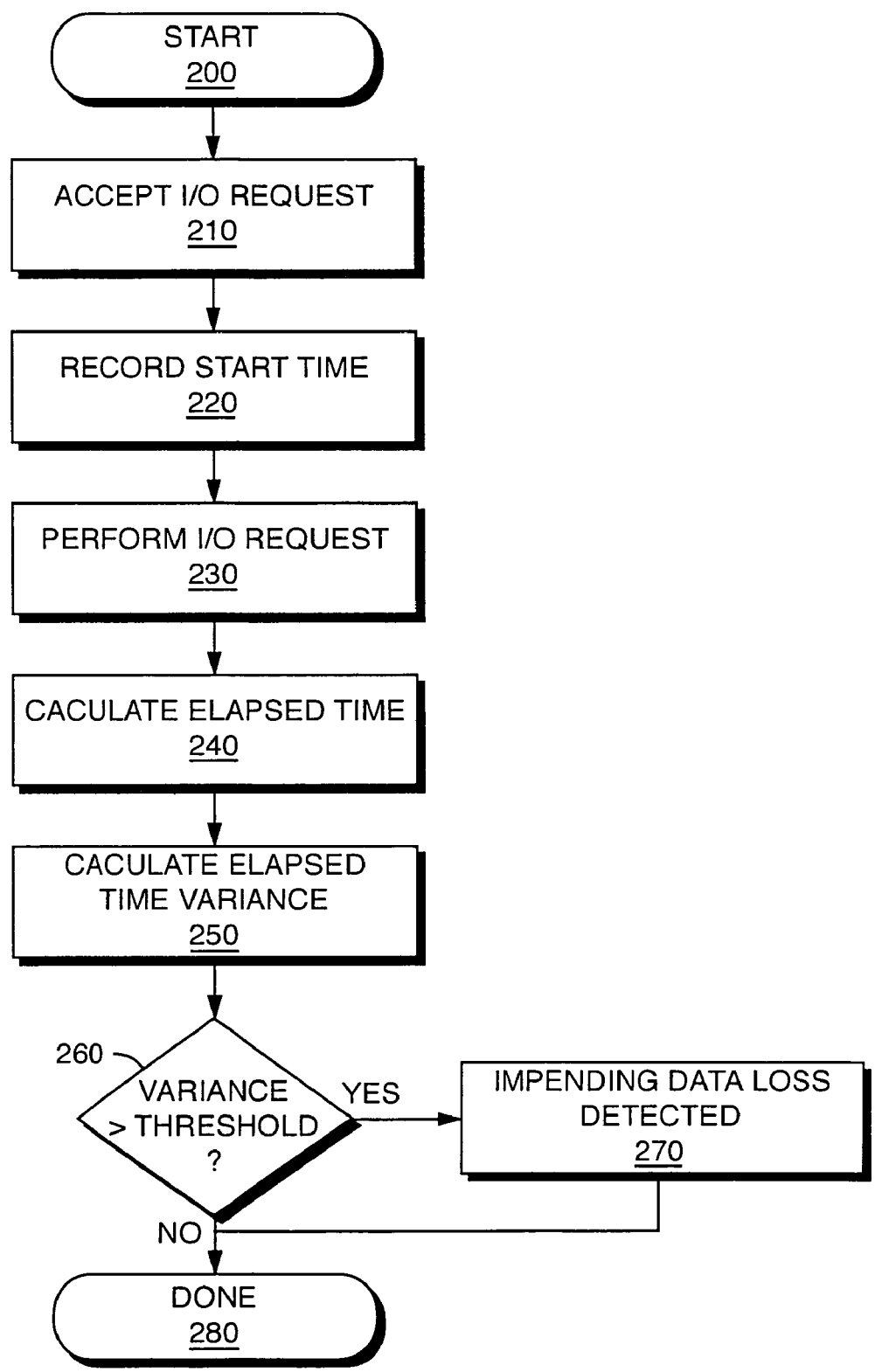
FIG. 2 shows the impending error detection process based on observation of I/O timing variance.

FIG. 2 illustrates an impending data error detection process that uses I/O timing variance for its detection mechanism. The process begins at step 210 by accepting an I/O request, such as a data read or data write operation, from other components of the system. At step 220, the current time is recorded. Next at step 230, the I/O request is performed in the usual manner, such as by sending an I/O command to the disk drive, which in turn causes a data read or write operation to occur from or to the magnetic media on the disk, such as via a read/record head. Upon completion, at step 240 the elapsed time required to perform the I/O is computed. In step 250, computed elapsed time values from a number of consecutive I/O requests are analyzed statistically to compute the variance of the elapsed time. In step 260, the calculated variance is compared with a threshold setting to determine if it exceeds the expected variance. The expected variance can be established from data provided by the disk drive manufacturer, or from measurements made as part of product design or disk drive type acceptance. In step 270, if the observed variance exceeds the established threshold value, the process indicates that impending data loss has been detected. In either case, the I/O operation is now complete.

Figure 3:
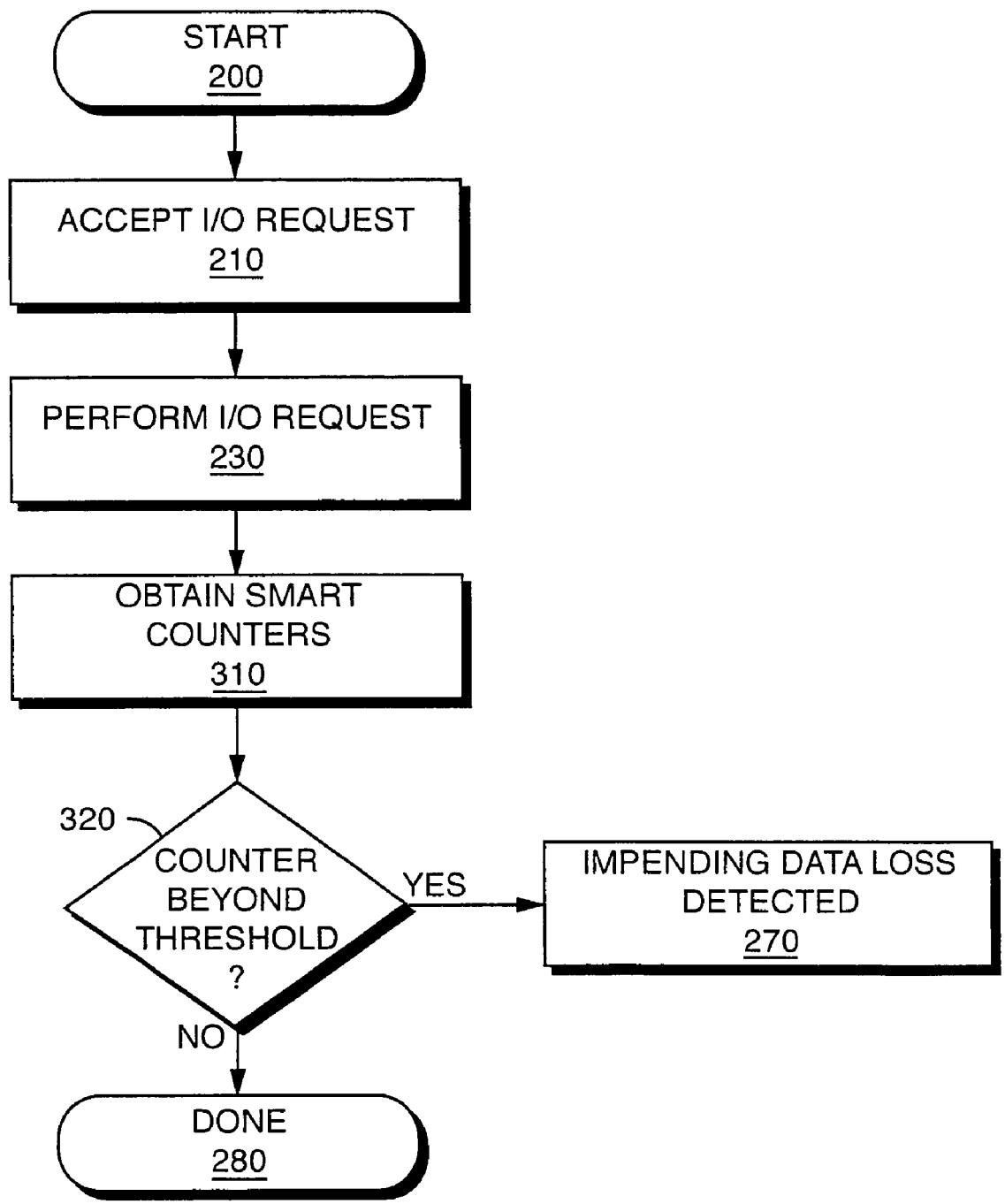
FIG. 3 shows the impending error detection process based on observation of SMART error statistics.

FIG. 3 illustrates an impending data error detection process that uses disk drive SMART (Self-Monitoring, Analysis, and Reporting Technology) counters for its detection mechanism. Such SMART counters are typically maintained by most modern commodity disk drives 140 and can be read by drive electronics 150 and/or storage controller 120. The process begins at step 210 by accepting an I/O request from other components of the system. At step 230, the I/O request is performed in the usual manner. Upon completion, at step 310 the SMART counters are obtained. In step 320, appropriate SMART counters, such as the Raw Read Error Rate counter, are compared with a threshold setting. The threshold setting is typically chosen by design and may be supplied by the manufacturer of the disk drive. At step 270, if the counter value is beyond the threshold, the process indicates that impending data loss has been detected. In either case, the I/O operation is now complete.

Figure 4:
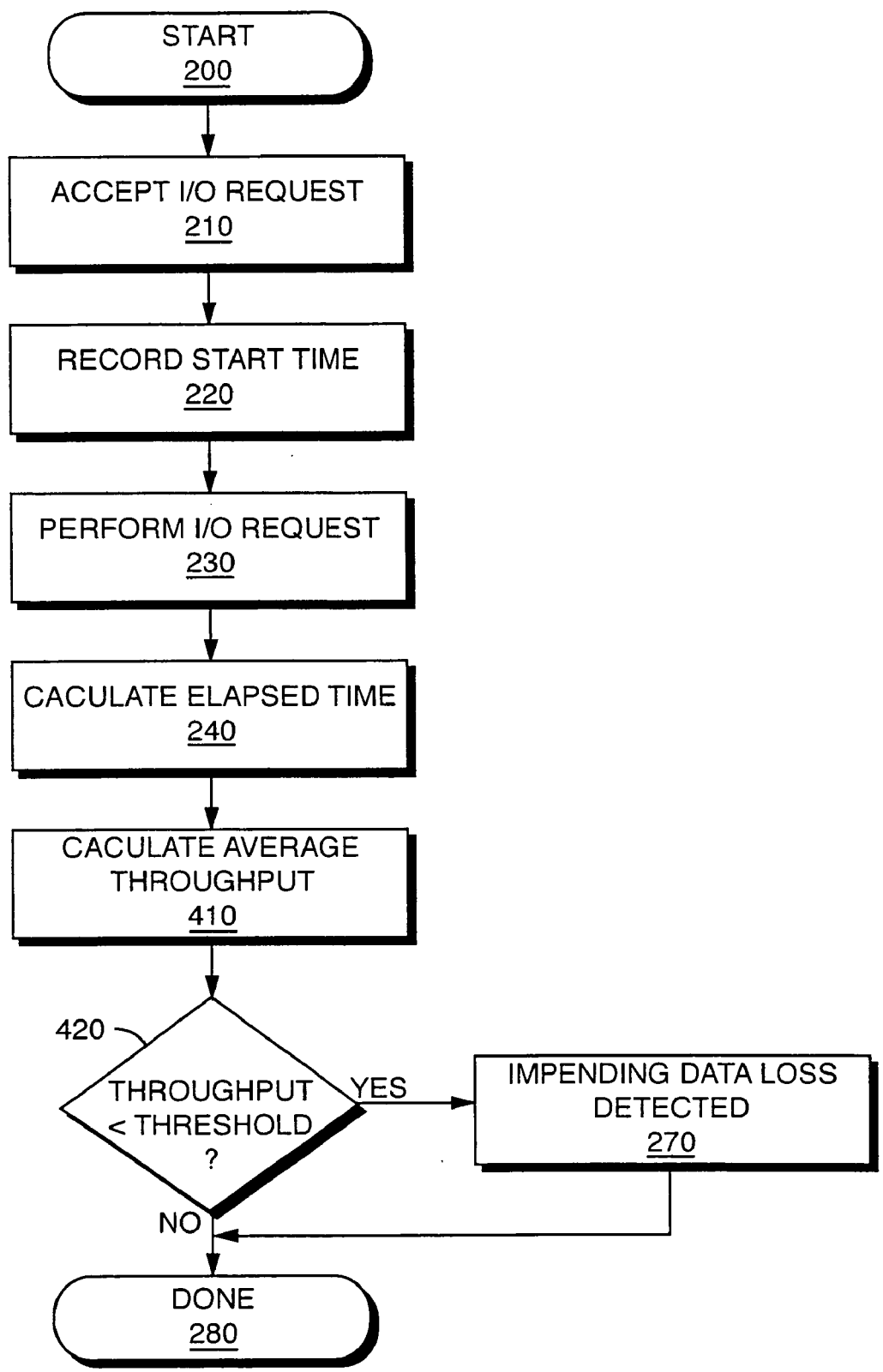
FIG. 4 shows the impending error detection process based on observation of sequential I/O throughput.

FIG. 4 illustrates an impending data error detection process that uses deviation from expected throughput for its detection mechanism. The process begins at step 210 by accepting an I/O request from other components of the system. At step 220, the current time is recorded. Next at step 230, the I/O request is performed in the usual manner. Upon completion, at step 240 the elapsed time required to perform the I/O is computed. In step 410, computed elapsed time values from a number of consecutive I/O requests for a given disk drive track or portion of a track are analyzed statistically to compute the average I/O throughput. In step 420, the calculated throughput is compared with a threshold setting to determine if it exceeds the expected variance. The expected throughput can be established from data provided by the disk drive manufacturer, or from measurements made as part of product design or disk drive type acceptance; this is described further below in FIGS. 12A-12B. In step 270, if the observed throughput is less than the established threshold value, the process indicates that impending data loss has been detected for the track or portion of the track in question. In either case, the I/O operation is now complete.

Figure 5:
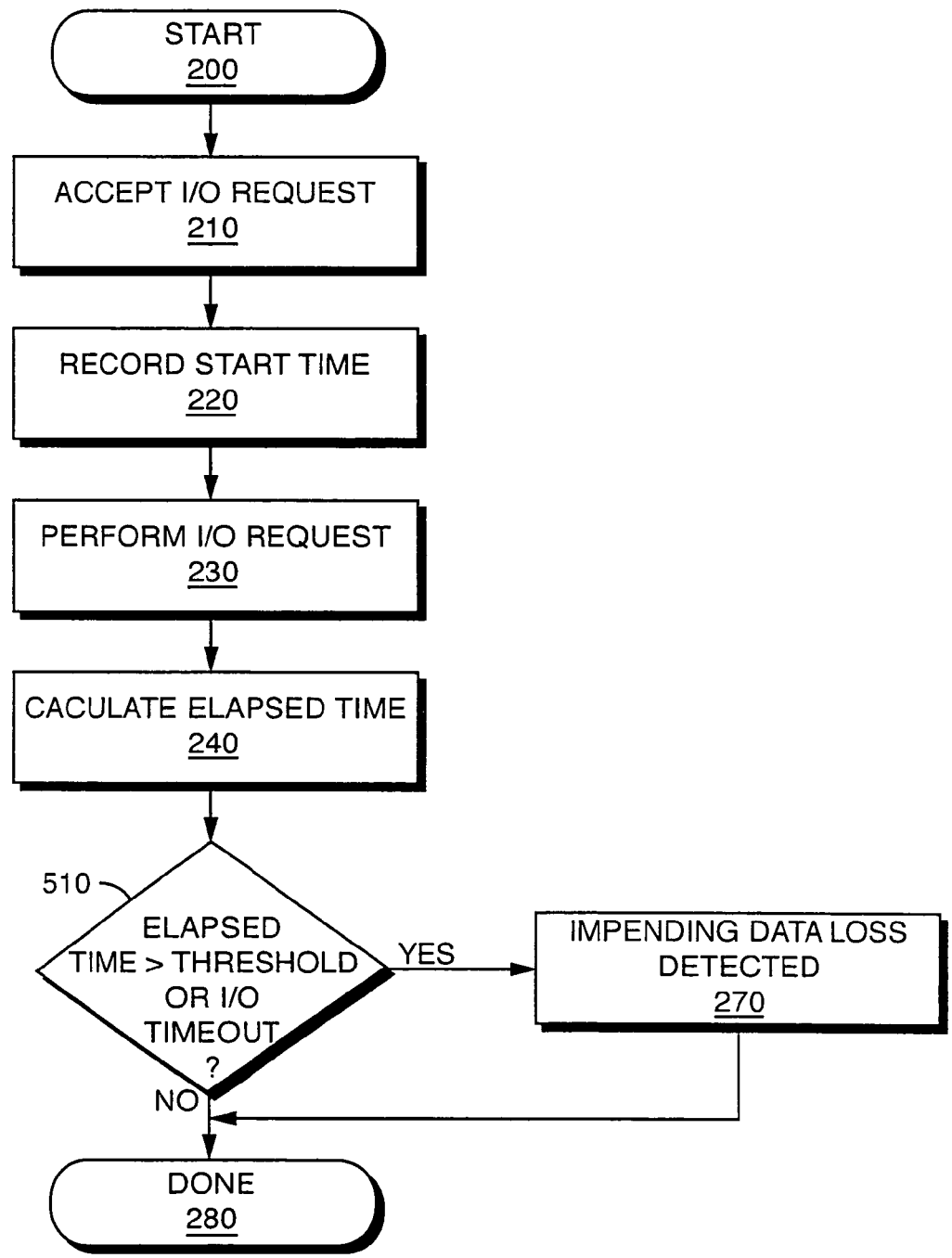
FIG. 5 shows the impending error detection process based on observation of individual I/O timing.

FIG. 5 illustrates an impending data error detection process that uses I/O timing and I/O operation timeout for its detection mechanism. The process begins at step 210 by accepting an I/O request from other components of the system. At step 220, the current time is recorded. Next at step 230, the I/O request is performed in the usual manner. Upon completion, at step 240 the elapsed time required to perform the I/O is computed. In step 510, the elapsed is compared with a threshold setting to determine if it exceeds the expected time required to perform an I/O operation, or if the I/O operation timed out. The expected I/O latency can be established from data provided by the disk drive manufacturer, or from measurements made as part of product design or disk drive type acceptance. In step 270, if the I/O timed out or the elapsed time exceeds the established threshold value, the process indicates that impending data loss has been detected. In either case, the I/O operation is now complete.

Figure 6:
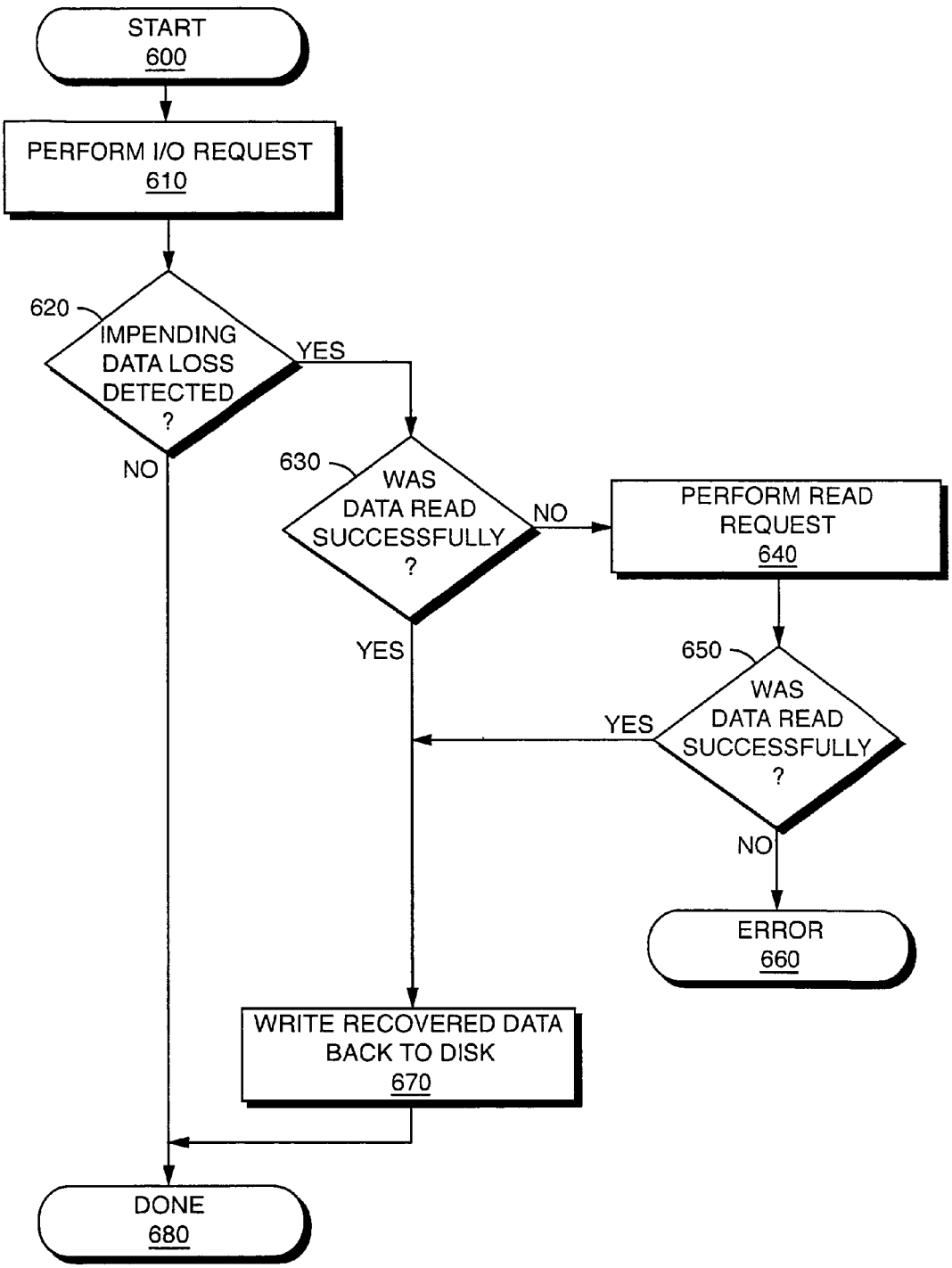
FIG. 6 shows the error repair process in its basic form.

FIGS. 6 and 7 are flow charts for processes that respond to an indication of impending data loss by taking corrective action.

In each of these processes, the corrective action has the effect of completely repairing the impending error; that is, the operation of the disk (for that track or portion of the track) is restored to full normal operation at normal performance. This produces several benefits. First, the gradual onset of the data integrity error is stopped before it becomes severe enough to make the data unrecoverable. Second, as discussed above, the normal disk drive recovery mechanisms triggered by the gradual onset error have a cost in I/O performance; the repair process, by eliminating the error, restores the drive to its full performance. The corrective action appropriate for the "track squeeze" error is rewriting of the affected tracks or portion of a track. A single rewrite operation suffices for current generation disk drives. However, the processes described here are not limited to a single rewrite operation, and other recovery mechanisms (for example, multiple rewrite operations) may be employed if the disk drive technology changes to make such changes necessary. Furthermore, the recovery process may rewrite a region larger than a single track. This effectively handles cases where track squeeze occurs on several adjacent tracks, or when the disk access patterns are such that detectable track squeeze on one track is an indication that track squeeze is likely to be a near-term risk on other tracks in the region.

In FIG. 6, the correction process starts by performing an I/O request 610 according to any of the processes shown above in FIGS. 2 through 5. In step 620, the process checks whether the I/O operation process 610 indicated that impending data loss was detected. If not, the I/O operation is complete. If impending data loss was detected, step 630 then determines whether the I/O operation was a read operation and that operation successfully read the data requested. If not (i.e., either the operation was not a read, or it was not successful), at step 640 the process performs a read operation. This read operation 640 may include more extensive than normal error recovery mechanisms, for example the use of longer than normal timeouts, to maximize the probability that the data can be read from the disk drive. At step 650, the process checks if that read operation succeeded; if not, the I/O operation is unsuccessful and no corrective action is possible, at step 660. If data was read successfully either via step 630 or step 650, the data obtained is written back to the disk at step 670. At this point, the I/O operation is complete and successful.

FIG. 7 illustrates an I/O process incorporated in a storage system that includes data recovery mechanisms beyond that which can be performed by the disk drives 140 themselves. Such data recovery mechanisms may include RAID, or other mechanisms such as data replication or data backup. They may also include mechanisms that can reconstruct the needed data on demand from information maintained in higher layer memory data, for example RAID metadata, or control structures in a file system or storage virtualization (logical volume manager) system. The process starts by performing an I/O request 610 according to any of the processes shown above in FIGS. 2 through 5. In step 620, the process checks whether the I/O operation process 610 indicated that impending data loss was detected. If not, the I/O operation is complete. If impending data loss was detected, step 630 then determines whether the I/O operation was a read operation and that operation successfully read the data requested. If not (i.e., either the operation was not a read, or it was not successful), at step 640 the process performs a read operation. This read operation 640 may include more extensive than normal error recovery mechanisms, for example the use of longer than normal timeouts, to maximize the probability that the data can be read from the disk drive. At step 650, the process checks if that read operation succeeded. If not, at step 700 the process uses the available higher layer data recovery mechanisms (such as RAID) to reconstruct the data that could not be read from the disk drive. The data obtained either by successful read operations at step 630 or 650, or by the higher layer data reconstruction step 700, is then written back to the disk at step 710. At this point, the I/O operation is complete and successful.

Figure 8:
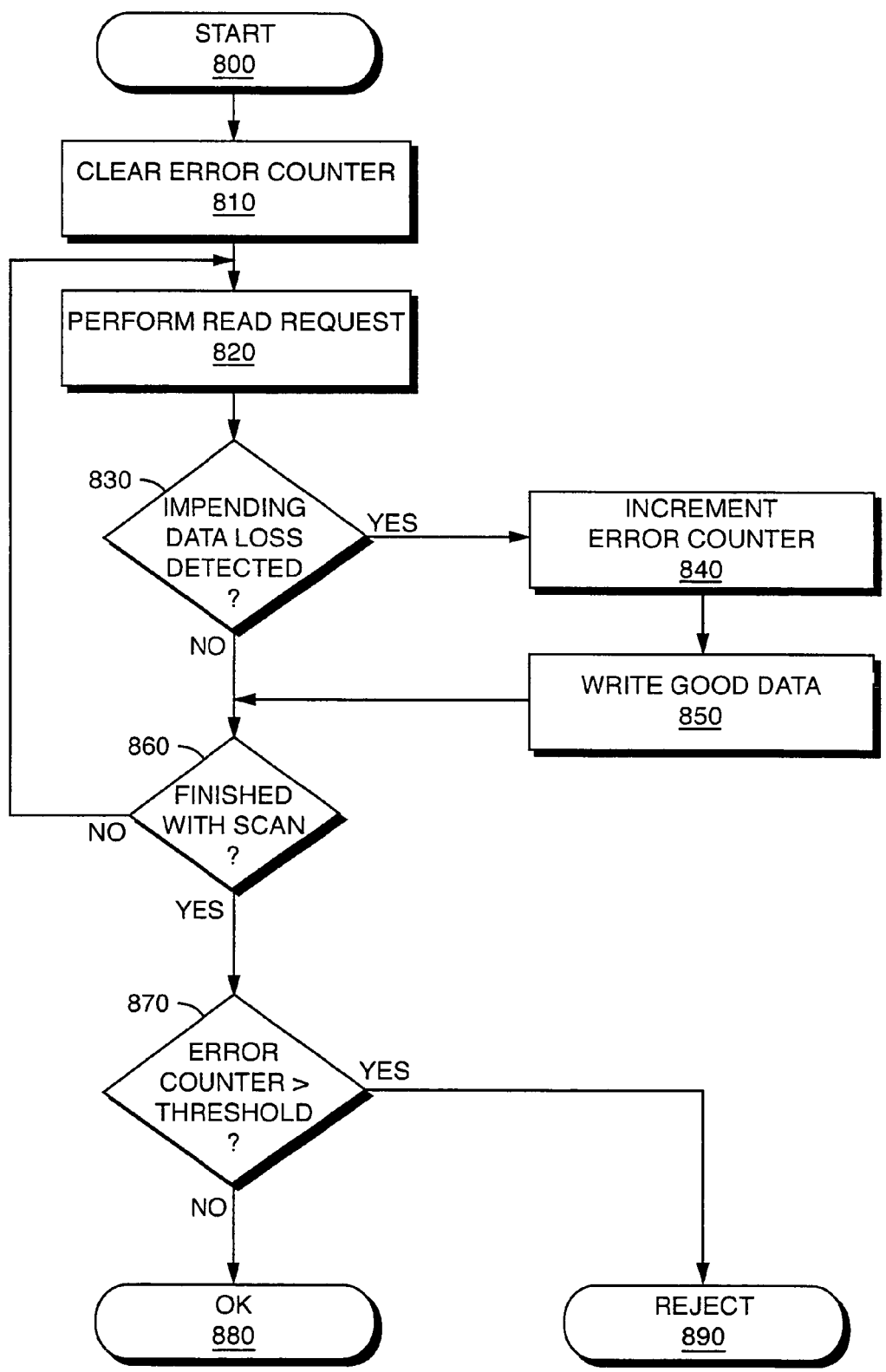
FIG. 8 shows a step in a disk drive acceptance process or a failure analysis process, based on the impending error detection processes.

FIG. 8 is a flow chart for a device acceptance or fault analysis process. The illustrated process could be one of the steps in an incoming disk drive screening process used in a manufacturing line. It can also be used as a step in a fault analysis process applied to disk drives suspected to be defective.

The process begins at step 810 by initializing an error counter. Next, at step 820, a read request is performed according to any of the processes described in FIGS. 2 through 5. Upon completion, the process tests whether the read process 820 reported impending data loss. If yes, at step 840 the error counter is incremented, and at step 850 known good data is written to repair the impending error. Step 860 then tests whether the disk scan is complete, and if not, the process repeats steps 820 through 850 as required to scan the disk drive thoroughly. Upon completion of the scan, at step 870 the error counter is compared with a threshold value. The threshold value is set by design or engineering policy, based on a determination of what level of impending data loss indication is considered acceptable and normal in the current generation of disk drives. If the error counter exceeds the established threshold, the disk drive is rejected at step 890; otherwise it is accepted at step 880.

Figure 9:
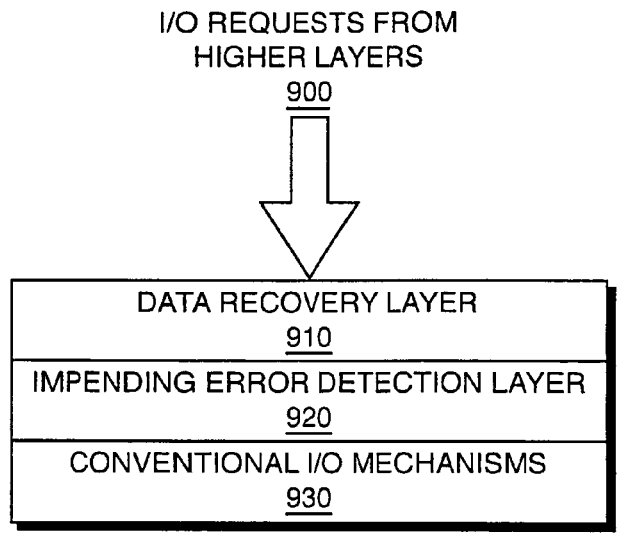
FIG. 9 shows a layering of the detection and repair processes within the user I/O processing path of an operating system, storage system, or disk drive.
Figure 10:
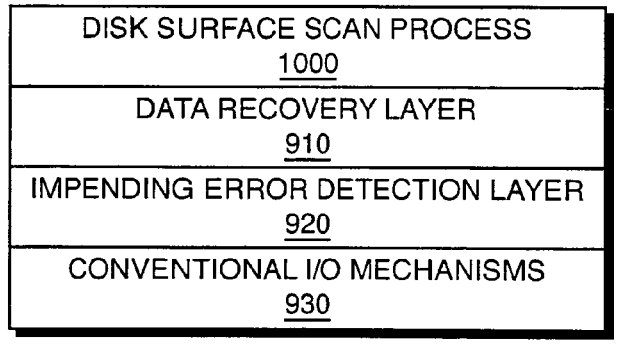
FIG. 10 shows a layering of the detection and repair processes in a surface scan background process for an operating system, storage system, or disk drive.
Figure 11:
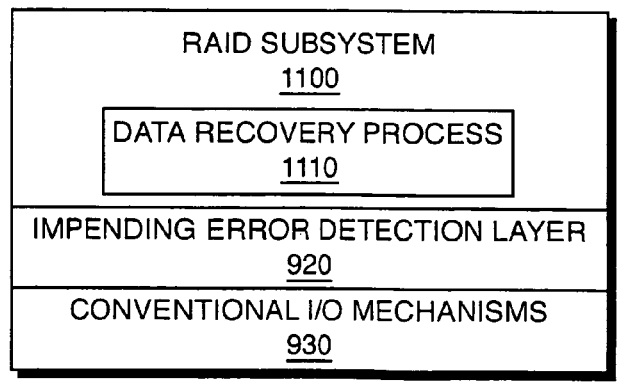
FIG. 11 shows a layering of the detection and repair processes within an operating system or storage system that implements RAID.

FIGS. 9 through 11 illustrate how the processes described above may be incorporated into the layered structure of an operating system storage subsystem, storage controller, or disk drive I/O processing subsystem.

In FIG. 9, the detection and recovery processes are incorporated in the processing path that processes I/O requests from the users or application programs that use the storage device. These I/O requests are represented schematically by arrow 900. These I/O requests may be submitted, for example, via operating system request mechanisms, or via messages delivered across a system bus or SAN. The lowest processing layer 930 is the conventional I/O processing layer, for example a device driver. Layered above that layer 930 is impending error detection layer 920, which implements any of the processes shown in FIGS. 2 through 5. Layered above that is an error recovery layer 910, which implements the process described in FIG. 6 (or possibly that described in FIG. 7).

In FIG. 10, the detection and recovery processes are used by a disk surface scan process 1000. This approach is useful when it is desirable to scan the entire surface of the disk drive (or all disk drives) for gradual onset errors, rather than only rely on detecting such impending errors when the affected area is actually referenced by users or application programs. Note that both approaches may be combined within a single system, i.e., both the methods of FIG. 9 and the method of FIG. 10 may exist in a system at the same time. This provides both real-time recovery from errors detected during user I/O handling, and background scanning for errors on the entire disk or disk array.

Surface scan process 1000 generates read requests such as to scan over the entire disk drive, or array of disk drives. Typically, this process will be responsive to system load to avoid a significant impact on application performance. These I/O requests are passed down the layers. The lowest processing layer 930 is the conventional I/O processing layer, for example a device driver. Layered above that layer 930 is impending error detection layer 920, which implements any of the processes described in FIGS. 2 through 5. Layered above that layer 920 is error recovery layer 910, which implements the process described in FIG. 6 (or possibly that described in FIG. 7).

FIG. 11 illustrates an example of the detection and recovery processes incorporated in a storage system that implements RAID. The lowest processing layer 930 is the conventional I/O processing layer, for example a device driver. Layered above that layer 930 is impending error detection layer 920, which implements any of the processes described in FIGS. 2 through 5. Layered above that layer 920 is RAID subsystem 1100. Contained within the RAID subsystem is recovery process 1110, which implements the process described in FIG. 7. In cases where the recovery process cannot recover data from an individual disk drive, it employs the higher layer redundancy mechanisms of RAID to reconstruct the lost data, which it then uses to correct the error as shown in FIG. 7, at steps 700 and 710.

Figure 12A:
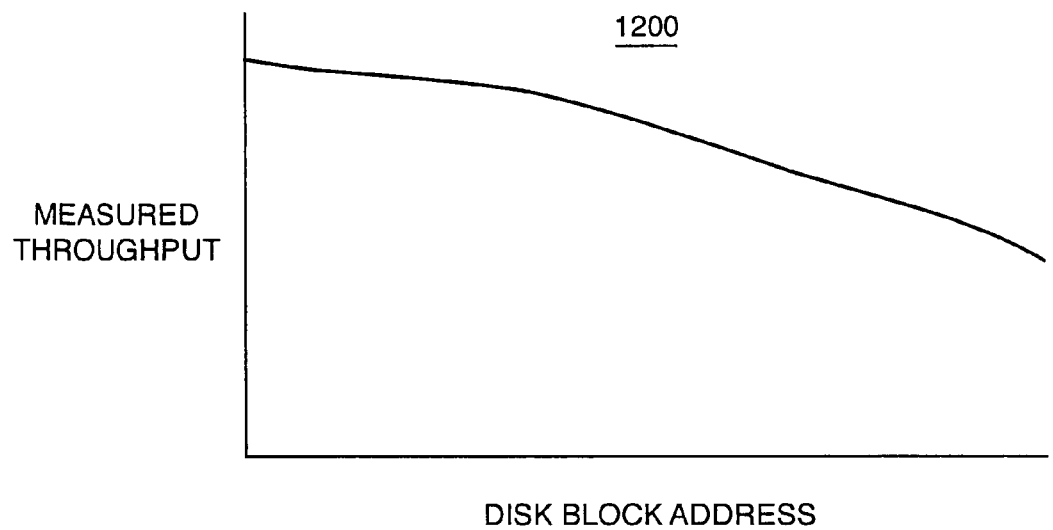
FIGS. 12A-12B show an example of I/O throughput as a function of disk drive block address for a normally operating disk drive, and for a disk drive affected by track squeeze.
Figure 12B:
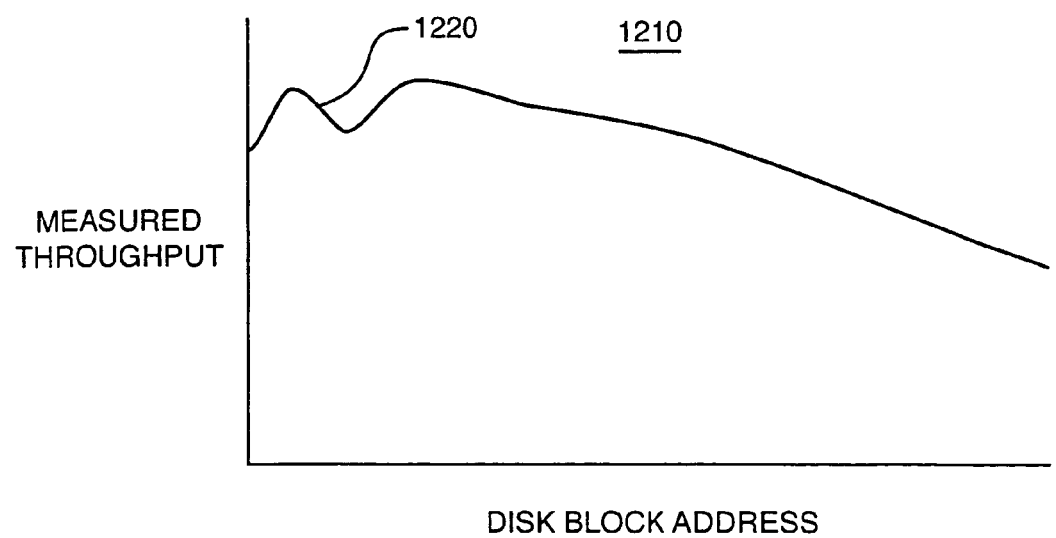

FIGS. 12A-12B illustrate that measured I/O throughput is dependent on disk block address, and shows an example of throughput affected by errors such as track squeeze.

Graph 1200 is a typical example of measured I/O throughput for a fully functional drive. The graph shows disk block address on the X-axis vs. throughput on the Y-axis. As shown here, throughput is not constant for all blocks; instead it varies in a fairly smooth fashion according to block address. The underlying reason for this is that in modern disk drives the number of blocks per track (i.e., per disk revolution) changes according to the circumference of the track, so lower block numbers, which are closer to the outer (longer) tracks, correspond to more sectors accessed per disk revolution. For a given disk drive model, the expected throughput graph 1200 is fixed, and can be learned from data provided by the drive manufacturer or measured during system design or as part of drive type acceptance.

Graph 1210 shows an example of the change in I/O throughput caused by gradual onset errors such as track squeeze. In this example, region 1220 of the graph shows lower than expected throughput and deviates significantly from the corresponding region of the normal smooth graph 1200. This deviation, when it exceeds a threshold set by design, is used in the process described in FIG. 4 as indication of impending data loss.

While this invention has been particularly shown and described with references to example embodiments thereof, it will be understood by those skilled in the art that various changes in form and details may be made therein without departing from the scope of the invention encompassed by the appended claims.

What is claimed is:

1. A method for processing an error condition in a mass data storage media device which records data in concentric adjacent tracks of an electromagnetic storage media, the method comprising the steps of:

initiating a user data input/output (I/O) operation to a particular identified user data area within the storage media device;

analyzing a result of the I/O operation to predict when a track squeeze error condition indicating an error unrecoverable by the media device itself is likely to start occurring during a future user data I/O operation that accesses the particular identified user data area within the storage media device, but which track squeeze error condition had not actually yet occurred; and rewriting user data to at least one track proximate to the particular identified area; and wherein the analyzing step further comprises:

determining a variance in completion time of the result from the I/O operation exceeding a threshold.

2. A method as in claim 1 wherein the analyzing step further comprises:

examining whether a raw read error rate in the result from the I/O operation is exceeding a predetermined threshold.

3. A method as in claim 1 wherein the analyzing step further comprises:

comparing any one or more of Self-Monitoring, Analysis, and Reporting Technology (SMART) counter data values in the result from the I/O operation against predetermined acceptable performance thresholds.

4. A method as in claim 1 wherein the analyzing step further comprises:
    determining if a sequential read throughput rate in the result from the I/O operation is less than an expected throughput by a difference exceeding a predetermined threshold amount.

5. A method as in claim 4 wherein the expected throughput is determined as a function of block address of the affected track.

6. A method as in claim 4 wherein the expected throughput is determined as a function of block address measured for a disk type during system design or drive type acceptance.

7. A method as in claim 1 wherein the analyzing step further comprises:
    determining if the timing of the result of the I/O operation is slower than expected by a threshold.

8. A method as in claim 1 wherein the analyzing step further comprises:
    determining if a timeout of in the result of the (I/O) operation has occurred.

9. A method as in claim 1 wherein the rewriting step additionally comprises:
    rewriting a track within which the particular identified area is located.

10. A method as in claim 9 wherein the rewriting step additionally comprises:
    reading data from the particular identified area before it becomes unrecoverable.

11. A method as in claim 10 wherein the rewriting step additionally comprises:
    permitting a longer than normally specified read timeout if necessary to read data from the identified area.

12. A method as in claim 9 wherein the rewriting step additionally comprises:
    determining data to be rewritten in the identified area via a redundant data copy provided at higher layers in a storage system of which the disk drive is a part.

13. A method as in claim 12 wherein the higher layer redundant data copy is provided by a higher layer system function selected from the group consisting of Redundant Array of Independent Disks (RAID), data replication, or backup data storage.

14. A method as in claim 12 wherein the mass storage device is part of an array of mass storage devices used to provide a high availability storage array.

15. A method as in claim 12 wherein the higher layer redundant data copy is regenerated by examining one or more states of system elements.

16. A method as in claim 12 wherein the higher layer redundant data copy is regenerated by a higher layer system function selected from the group consisting of Redundant Array of Independent Disks (RAID), file system, or storage virtualization system.

17. A method as in claim 9 wherein the rewriting step additionally comprises:
    rewriting the identified area once.

18. A method as in claim 9 wherein the rewriting step additionally comprises:
    rewriting the identified area multiple times.

19. A method as in claim 1 wherein the rewriting step additionally comprises:
    rewriting a range of tracks comprising the particular identified area.

20. A method as in claim 1 wherein the analyzing and rewriting steps are implemented as additional processing in a regular active I/O processing path of the mass storage device.

21. A method as in claim 1 wherein the analyzing and rewriting steps are implemented as a background thread that runs when the storage device is idle.

22. A method as in claim 1 wherein the analyzing and rewriting steps are carried out during execution of an application program when the drive is in use by an end customer.

23. A method as in claim 1 wherein the analyzing and rewriting steps are used for fault analysis of failed drives returned from a customer.

24. A method as in claim 1 wherein the analyzing and rewriting steps are implemented in a general purpose operating system such as might be used for server computers.

25. A method as in claim 1 wherein the analyzing and rewriting steps are implemented in firmware or hardware in a storage controller.

26. A method as in claim 1 wherein the analyzing and rewriting steps are implemented in a storage controller contained within a computer system, attached via a local computer bus.

27. A method as in claim 26 wherein the local computer bus is a Peripheral Component Interconnect (PCI) bus.

28. A method as in claim 1 wherein the analyzing and rewriting steps are implemented in a storage controller attached to a Storage Area Network.

29. A method as in claim 1 wherein the analyzing and rewriting steps are implemented in drive electronics located in one or more disk drive assemblies.

30. A method as in claim 1 wherein the analyzing and rewriting steps are implemented in a distributed fashion among one or more places selected from a group consisting of a general purpose operating system executing on a host computer, in firmware in a storage controller, or in drive electronics located in a disk drive assembly.

31. A method for processing an error condition in a mass data storage media device which records data in concentric adjacent tracks of an electromagnetic storage media, the method comprising the steps of:
    initiating a user data input/output (I/O) operation to a particular identified user data area within the storage media device;
    analyzing a result of the I/O operation to predict when a track squeeze error condition indicating an error unrecoverable by the media device itself is likely to start occurring during a future user data I/O operation that accesses the particular identified user data area within the storage media device, but which track squeeze error condition had not actually yet occurred; and
    rewriting user data to at least one track proximate to the particular identified area and
    wherein the track squeeze error detection process is used during a manufacturing test process as a component screening process for incoming test of a disk drives drive when it is to be incorporated into a larger system.

32. A method as in claim 31 wherein the screening process rejects drives based on either excessive track squeeze detected or track rewrite not being effective.

33. An apparatus for processing an error condition in a mass data storage device which records data in concentric adjacent tracks of an electromagnetic storage media, the apparatus comprising:
    detect when a track squeeze error condition indicating an error unrecoverable by the media device itself is likely to start occurring, but which has not yet actually occurred, during a future I/O operation to the particular identified area within the storage media;

an interface, for initiating a user data input/output (I/O) operation to a particular identified storage area on the storage media; and an analyzer, for analyzing a result of the I/O operation to a data recording apparatus, for rewriting data stored in at least one track proximate to the particular identified area of the storage media wherein the analyzer further comprises:

a comparator, for determining if a variance in completion time of the I/O operation exceeds a threshold.

34. An apparatus as in claim 33 wherein the comparator further comprises:

a comparator, for determining whether a raw read error rate resulting from the I/O operation is exceeding a predetermined threshold.

35. An apparatus as in claim 33 wherein the comparator further comprises:

a comparator, for comparing any one or more of Self-Monitoring, Analysis, and Reporting Technology (SMART) counter data values reported by the I/O operation against predetermined acceptable performance thresholds.

36. An apparatus as in claim 33 wherein the comparator f further comprises:

a comparator, for determining if a sequential read throughput rate resulting from the I/O operation is less than an expected throughput by a difference exceeding a predetermined threshold amount.

37. An apparatus as in claim 36 wherein the expected throughput is determined as a function of block address of the affected track.

38. An apparatus as in claim 37 wherein the expected throughput is determined as a function of block address measured for a disk type during system design or drive type acceptance.

39. An apparatus as in claim 33 wherein the comparator f further comprises:

a comparator, for determining if the timing of the result of the I/O operation is slower than expected by a threshold.

40. An apparatus as in claim 33 wherein the comparator further comprises:

a comparator, for determining if a timeout of in the I/O operation has occurred.

41. An apparatus as in claim 33 wherein the data write apparatus additionally rewrites a track within which the particular identified area is located.

42. An apparatus as in claim 41 wherein the write apparatus additionally rewrites a range of tracks comprising the particular identified area.

43. An apparatus as in claim 41 additionally comprising:

a data read apparatus, for reading data from the identified area before it becomes unrecoverable.

44. An apparatus as in claim 43 wherein the data read apparatus additionally comprises components for permitting a longer than normally specified read timeout if necessary to read data from the identified area.

45. An apparatus as in claim 41 wherein the write apparatus additionally determines data to be rewritten in the identified area via a redundant data copy provided at higher layers in a storage system of which the disk drive is a part.

46. An apparatus as in claim 45 wherein the higher layer redundant data copy is provided by a higher layer system function selected from the group consisting of Redundant Array of Independent Disks (RAID), data replication, or backup data storage.

47. An apparatus as in claim 45 wherein the mass storage device is part of an array of mass storage devices used to provide a high availability storage array.

48. An apparatus as in claim 45 wherein the higher layer redundant data copy is regenerated by examining one or more states of system elements.

49. An apparatus as in claim 45 wherein the higher layer redundant data copy is regenerated by a higher layer system function selected from the group consisting of Redundant Array of Independent Disks (RAID), file system, or storage virtualization system.

50. An apparatus as in claim 41 wherein the write apparatus rewrites the identified area at least once.

51. An apparatus as in claim 41 wherein the write apparatus additionally rewrites the identified area multiple times.

52. An apparatus as in claim 33 wherein the analyzer and write apparatus are implemented as additional processing in a regular active I/O processing path of the mass storage device.

53. An apparatus as in claim 33 wherein the analyzer and write apparatus are implemented as a background thread that runs when the storage device is idle.

54. An apparatus as in claim 33 that is used during a manufacturing test process as a test for disk drives to be placed in service.

55. An apparatus as in claim 54 wherein the test process rejects drives based on either excessive track squeeze detected or track rewrite not being effective.

56. An apparatus as in claim 33 wherein the analyzer and data write apparatus are implemented at least partially as an application program when the drive is in use by an end customer.

57. An apparatus as in claim 33 wherein the analyzer and data write apparatus are used for fault analysis of failed drives returned from a customer.

58. An apparatus as in claim 33 wherein the analyzer and data write apparatus are implemented at least partially in a general purpose operating system such as might be used for server computers.

59. An apparatus as in claim 33 wherein the analyzer and data write apparatus are implemented at least in part in firmware or hardware in a storage controller.

60. An apparatus as in claim 33 wherein the analyzer and data write apparatus are implemented at least in part in a storage controller contained within a computer system, attached via a local computer bus.

61. An apparatus as in claim 60 wherein the local computer bus is a Peripheral Component Interconnect (PCI) bus.

62. An apparatus as in claim 33 wherein the analyzer and data write apparatus are implemented in a storage controller attached to a Storage Area Network.

63. An apparatus as in claim 33 wherein the analyzer and data write apparatus are implemented at least in part in drive electronics located in one or more disk drive assemblies.

64. An apparatus as in claim 33 wherein the analyzer and data write apparatus are implemented in a distributed fashion among one or more places selected from a group consisting of a general purpose operating system executing on a host computer, in firmware in a storage controller, or in drive electronics located in a disk drive assembly.

* * * * *